Patented Nov. 30, 1926.

1,609,064

UNITED STATES PATENT OFFICE.

SEWELL M. CORBETT, OF THE UNITED STATES ARMY.

FOODSTUFF FOR CATTLE.

No Drawing.   Application filed January 31, 1924. Serial No. 689,784.

This invention relates to a new and useful food compound for cattle and has for its primary object the production of a nutritious, wholesome and inexpensive stock food, prepared from pineapple residue heretofore discarded as waste material.

Another object of this invention is to provide a cattle food consisting of pineapple residue mixed with other ingredients to increase its bulk and at the same time impart other nutritious properties essential to the production of a scientifically balanced stock food.

In the pineapple industry, after the juice has been expressed from the outside shells, central cores, trimmings, ends and etc. there remains a pulp like mass, which for want of a better name may be defined as waste or residue.

Some canners have further treated this residue for alcohol extraction, while others either cart it away for use as fertilizer or dump it in a convenient gulch and allow nature to take its course.

The handling of this material has proved a vexing and a serious problem, because, despite the many presses through which it has been caused to pass (owing to the lack of fiber in the pineapple), the pulp still contains from 83% to 90% juice and when allowed to stand quickly ferments, thus attracting myriads of flies, beetles and other insects, which form not only an annoyance but constitutes an actual menace to the health of the community.

It is therefore the fundamental aim and purpose of this invention to provide for the consumption of this residue or waste by subjecting it to carefully controlled temperatures and mixing the resulting product with a proper balancing ration to form a stock food for cattle.

In carrying this invention into effect a suitable batch is placed in a kiln or rotary converter and subjected to a temperature sufficiently well above boiling to thoroughly dry without burning. When this operation is complete the resulting product when analyzed will be found to contain the following ingredients and proportions thereof:

Sample 1.

|  | Per cent. |
|---|---|
| Water | 17.82 |
| Protein | 3.65 |
| Ether extract | 0.49 |
| Invert sugar | 14.20 |
| Sucrose | 7.66 |
| Starch, etc. (by indifference) | 38.18 |
| Fiber | 13.25 |
| Ash | 4.75 |

Another batch similarly treated and subjected to a higher temperature disclosed the following ingredients and proportions thereof.

Sample 2.

|  | Per cent. |
|---|---|
| Water | 10.63 |
| Protein | 3.62 |
| Ether extract | 1.01 |
| Invert sugar | 11.96 |
| Sucrose | 8.70 |
| Starch, etc. (by indifference) | 42.15 |
| Fiber | 18.23 |
| Ash | 3.70 |

Comparing the two samples it is evident that the proportions of water, protein, ether extract and etc., may be varied at will dependent upon the temperature to which the waste has been subjected.

After the waste or residue has been dried as stated, it is pulverized and then if desirable embodied in the following mixtures in approximately the following proportions, 50% residue, 30% wheat middlings, 10% cocoanut meal or cotton seed meal and 10% tankage, which produces an excellent well balanced ration for cattle.

In various tests wherein groups of hogs were subjected to the mixture prepared as above the stock made an average gain of 1.19 pounds per day at a feed cost of .099 per pound gain, thus conclusively demonstrating the value of this preparation as a food for cattle.

In conclusion it is apparent this invention provides a food stuff for cattle which is not only inexpensive and highly nutritious, but also furnishes an avenue for the conservation of a product which otherwise would be discarded as waste material.

Although in the foregoing certain ingredients such as wheat middlings, etc., have been referred to as used in connection with pineapple residue, it is to be understood that the residue may be used alone or with various other nutritious ingredients, depending upon the exigencies of the situation, and such alterations in the compound may be resorted to within the scope of the appended claim without departing from or sacrificing any of the principles of this invention.

Having described my invention, what I claim as new and wish to secure by Letters Patent is:

An animal food product comprising dried pineapple residue.

SEWELL M. CORBETT.